(12) United States Patent
Priester, III et al.

(10) Patent No.: US 7,645,606 B2
(45) Date of Patent: Jan. 12, 2010

(54) IN SITU BIODEGRADATION OF SUBSURFACE CONTAMINANTS BY INJECTION OF PHOSPHATE NUTRIENTS AND HYDROGEN

(75) Inventors: Lamar E. Priester, III, Irmo, SC (US); Brian Harmison, Oak Hill, VA (US); John Huff, Finksburg, MD (US)

(73) Assignee: PHA Environmental Restoration, Herndon, VA (US)

( * ) Notice: Subject to any disclaimer, the term of this patent is extended or adjusted under 35 U.S.C. 154(b) by 266 days.

(21) Appl. No.: 10/394,646

(22) Filed: Mar. 24, 2003

(65) Prior Publication Data
US 2003/0232423 A1 Dec. 18, 2003

Related U.S. Application Data

(60) Provisional application No. 60/366,549, filed on Mar. 25, 2002.

(51) Int. Cl.
```
A62D 3/00      (2007.01)
A62D 3/02      (2007.01)
B09B 3/00      (2006.01)
B09C 1/10      (2006.01)
C02F 3/00      (2006.01)
```
(52) U.S. Cl. ............ 435/262.5; 435/262; 435/281; 208/262.1; 208/262.5; 405/128.45; 405/128.5; 210/601; 210/610; 210/611; 210/613

(58) Field of Classification Search .......... 435/262.5, 435/281, 262; 208/262.1, 262.5; 405/128.45, 405/128.5; 210/601, 610, 611, 613
See application file for complete search history.

(56) References Cited

U.S. PATENT DOCUMENTS

| | | | |
|---|---|---|---|
| 5,453,375 A | | 9/1995 | Stoner et al. |
| 5,480,549 A | | 1/1996 | Looney et al. |
| 5,560,737 A | | 10/1996 | Schuring et al. |
| 5,602,296 A | | 2/1997 | Hughes et al. |
| 5,622,864 A | | 4/1997 | Buchanan |
| 5,753,109 A | * | 5/1998 | Looney et al. ............ 210/149 |
| 5,753,122 A | | 5/1998 | Taylor et al. |
| 5,906,932 A | | 5/1999 | Kuriyama et al. |
| 6,143,177 A | | 11/2000 | Suthersan |
| 6,150,157 A | | 11/2000 | Keasling et al. |
| 6,265,205 B1 | | 7/2001 | Hitchens et al. |
| 6,322,700 B1 | | 11/2001 | Suthersan |
| 6,344,355 B1 | | 2/2002 | Hince et al. |
| 6,524,842 B1 | | 2/2003 | Vainberg et al. |
| 7,282,149 B2 | * | 10/2007 | Evans .................... 210/610 |
| 2004/0082055 A1 | * | 4/2004 | Hince et al. ............ 435/262.5 |
| 2006/0094106 A1 | | 5/2006 | Priester et al. |

FOREIGN PATENT DOCUMENTS

WO    WO 2005/061136    7/2005

OTHER PUBLICATIONS

Eggink, Gerrit et al., "Alkane Utilization in *Pseudomonas oleovorans*," The Journal of Biological Chemistry, 1988, pp. 13400-13405, vol. 263, No. 26.
Panke, Sven et al., "An Alkane-Responsive Expression System for the Production of Fine Chemicals," American Society for Microbiology, Applied and Environmental Microbiology, 1999, pp. 2324-2332, vol. 65, No. 6.
Grund, Alan et al., "Regulation of Alkane Oxidation in *Pseudomonas putida*," Journal of Bacteriology, 1975, pp. 546-556, vol. 123, No. 2.
Perchlorate Treatment Technology Update, Federal Facilities Forum Issue Paper, 2005, pp. 1-75. Appendix A and B.
Smits, Theo H. M., "Cloning and functional analysis of bacterial genes involved in alkane oxidation," Swiss Federal Institute Of Technology Zurich for the degree of Doctor of Natural Sciences, 2001, pp. 1-132, Zurich.
International Search Report and Written Opinion of the International Searching Authority dated Mar. 27, 2007. (4 pgs.).
Smits, et al., "New Alkane-Responsive Expressoin Vectors for *Escherichia coli* and *Pseudomonas*", Plasmid, 46 (2001) pp. 16-24.
Notice of Reference Cited in the corresponding U.S. Appl. No. 11/225,859, dated Feb. 6, 2009. (1 pg.).

* cited by examiner

*Primary Examiner*—William H Beisner
*Assistant Examiner*—Nathan A Bowers
(74) *Attorney, Agent, or Firm*—Foley & Lardner LLP

(57) ABSTRACT

The present invention provides a method and gaseous composition for the in situ bioremediation of soil and groundwater contaminated with organic compounds, including halogenated hydrocarbons. The gaseous composition, which readily permeates a subsurface region, comprises hydrogen ($H_2$) and one or more volatile phosphates, such as triethylphosphate (TEP) and tributylphosphate (TBP). The volatile phosphates serve as nutrients that stimulate the growth and activity of indigenous microbes that are capable of degrading the contaminants. The addition of hydrogen facilitates the direct reductive dehalogenation of highly halogenated contaminants. The gaseous composition may optionally contain one or more of a volatile alkane and nitrous oxide as additional supports for microbial growth, and carbon dioxide to lower the pH of remediation sites that are highly alkaline.

61 Claims, No Drawings

IN SITU BIODEGRADATION OF SUBSURFACE CONTAMINANTS BY INJECTION OF PHOSPHATE NUTRIENTS AND HYDROGEN

CROSS-REFERENCE TO RELATED PATENT APPLICATIONS

This application claims the benefit of U.S. Provisional Application No. 60/366,459, filed Mar. 25, 2002.

BACKGROUND OF THE INVENTION

Chemical contamination of subsurface environments damages local ecosystems and poses health risks where groundwater is used as a source of drinking or irrigation water. Such contamination emanates from various industrial and municipal sources including chemical storage sites, landfills, transportation facilities, and storage tanks located above ground and underground.

A number of methods for treating contaminated soil and groundwater have been available for some time. For example, soil may be excavated, treated at an off-site facility, incinerated and/or disposed. Other methods involve bioremediation techniques. Bioremediation methods employ natural processes to degrade contaminated soil or water. Such methods effectively treat a variety of contaminants. For example, contaminated groundwater may be pumped to the surface and treated to remove or degrade contaminants; similarly, contaminated soil can be removed from a site and treated with biological organisms (Buchanan, U.S. Pat. No. 5,622,864; Stoner et al., U.S. Pat. No. 5,453,375). These methods, however, tend to be expensive and laborious, they require long times for effective treatment, and they carry the risk of exposing contaminants to the atmosphere.

Alternative bioremediation techniques known in the art provide a supply of nutrients in situ via injection wells, thereby circumventing the need to pump or otherwise move contaminated material to the ground surface. These techniques increase bioremediation rates by furnishing heightened concentrations of nutrients to indigenous microbial populations that are capable of degrading contaminants. For example, Looney et al. (U.S. Pat. No. 5,480,549) describe a method by which vapor-phase phosphates such as triethylphosphate and tributylphosphate are metered into a gas stream that is injected via injection wells into contaminated soil and groundwater to stimulate the microbial degradation of hydrocarbon contaminants. The effectiveness of this method, however, is limited to the biodegradation of hydrocarbon contaminants, and is thus inadequate to bioremediate sites where more pernicious contaminants such as halogenated hydrocarbons (halocarbons) persist.

Halocarbons are ubiquitous and are used for a variety of purposes such as dry cleaning agents, degreasers, solvents, and pesticides. Unfortunately, they are one of the most pervasive and harmful classes of contaminants in ground water and soil. Chlorinated hydrocarbons (chlorocarbons) such as tetrachloroethylene (PCE), trichloroethylene (TCE), dichloroethylene (DCE), and vinyl chloride (VC), are exemplary common contaminants. This class of compounds is more resistant to microbial degradation, and thus tends to persist for long periods in the environment. Because the halogen atoms in halocarbons increase the oxidation potential of the carbon atoms to which they are bound, aerobic biodegradation processes are energetically less favorable, particularly for highly halogenated compounds. Consequently, highly halogenated compounds are much more susceptible to anaerobic degradation.

Organic compounds generally act as electron donors. Polyhalogenated compounds, however, behave as electron acceptors in reducing environments as a consequence of the presence of electronegative halogen substituents. Thus, more highly halogenated compounds are less susceptible to aerobic degradation, and more susceptible to anaerobic degradation.

In the environment, halogenated compounds may be naturally dehalogenated by a variety of chemical reactions and microbe-mediated reactions. Some compounds are transformed into products which are more degradable than the parent compounds, or may be more degradable under different environmental conditions. For example, PCE which has been recently released into soil and groundwater will not have degraded much; thus degradation (dehalogenation) will operate on mostly PCE and will be most efficacious in an anaerobic environment. A very old release of PCE, however, will have been naturally dehalogenated to some extent into daughter compounds TCE, DCE, and VC, which are most readily degraded in aerobic environments.

Some environments are inhabited by chemoheterotrophic microorganisms, which may be capable of anaerobically metabolizing existing carbon sources, resulting in the evolution of excess hydrogen ($H_2$). In the resultant reducing environment, PCE may undergo dehalogenation to TCE. Similarly, TCE may be dehalogenated to DCE and VC. As mentioned above, these latter products are not readily degraded in anaerobic conditions, but can be oxidized under aerobic conditions.

The bioremediation of soil and groundwater contaminated with highly chlorinated hydrocarbons is known in the art. Methods of stimulating the activity of indigenous microbes capable of degrading halocarbons has been achieved by treating subsurface environments with certain carbon nutrients, such as corn syrup and yeast extract (Keasling et al., U.S. Pat. No. 6,150,157) and molasses (Suthersan, U.S. Pat. Nos. 6,143,177 and 6,322,700). These methods, however, require the use of many injection wells, and are limited to the remediation of groundwater where the carbon sources are able to be dispersed. Consequently, they are not practical for the remediation of vadose zones, where the mobility of nutrients such as corn syrup and molasses is negligible. One attempt to overcome these limitations was disclosed by Hughes et al., (U.S. Pat. No. 5,602,296), whose method entails the injection of pure hydrogen ($H_2$) into contaminated subsurface regions. Reductive dechlorination of chlorinated hydrocarbons was suggested to be mediated by indigenous anaerobic bacteria. This method, however, creates a strongly reducing environment and is thus ineffective for the degradation of partially chlorinated hydrocarbons such as DCE and VC. Moreover, it is ineffective in the treatment of nonhalogenated contaminants. Finally, hydrogen is extremely flammable, and thus poses a serious health risk where it is used as a pure gas.

Thus, there is a need in the art for a method of in situ biodegradation that is useful against a wide variety of contaminants, including halocarbons and non-halogenated compounds. The present invention satisfies these needs by overcoming the limitations of the prior art discussed above.

SUMMARY OF THE INVENTION

The present invention relates to the in situ bioremediation of soil and groundwater at sites that are contaminated with various organic substances. Accordingly, one object of this invention provides a method of stimulating the in situ microbial degradation of one or more pollutants in a subsurface environment by contacting the subsurface environment with a gaseous, microbially nutritive composition. The composition comprises hydrogen ($H_2$) and one or more volatile phosphate nutrients, and is introduced to the subsurface environment at a rate, pressure, and time sufficient to degrade said one or more pollutants. The gaseous composition stimulates the growth and reproduction of indigenous bacteria that are capable of degrading the pollutants.

It is another object of the present invention to provide a gaseous, microbially nutritive composition that comprises hydrogen ($H_2$) and one or more volatile phosphate nutrients. The phosphate nutrient, which may be a liquid under standard conditions, is sufficiently volatile such that a carrier gas containing the hydrogen may readily entrain the phosphate nutrient in its gas phase. Thus, hydrogen and phosphate are delivered to a remediation site in vapor form, and are thereby dispersed effectively throughout the site.

Another aspect of the invention provides a method of stimulating in situ microbial degradation of one or more pollutants in a subsurface environment comprising the step of contacting the subsurface environment with a gaseous, microbially nutritive composition comprising hydrogen ($H_2$) and one or more volatile phosphate nutrients; wherein the composition is introduced to the subsurface environment at a rate, pressure, and time sufficient to degrade one or more pollutants. The volatile phosphate nutrients may be triethylphosphate (TEP) and tributylphosphate (TBP) in a concentration of 0.001%-1% (v/v); 0.005%-0.5% (v/v); 0.008%-0.02% (v/v); or 0.01% (v/v). The gaseous, microbially nutritive composition may further comprise 0.01%-10% (v/v); 0.015%-5% (v/v); or 0.1% (v/v) nitrous oxide ($N_2O$). The composition may further comprise 1%-50%, 1%-10% (v/v) $H_2$, 2%-7% (v/v) $H_2$, 3%-5% (v/v) $H_2$, or 4% (v/v) $H_2$. Additionally, the composition may further comprise 0.01%-10% (v/v); 0.015%-5% (v/v); or 0.1% (v/v) nitrous oxide ($N_2O$). The gaseous, microbially nutritive composition may still further comprise 0.1%-20% (v/v); 2%-6% (v/v); 4% (v/v) carbon dioxide ($CO_2$). The composition may still even further comprise a volatile alkane such as methane, ethane, propane, butane or pentane. The gaseous, microbially nutritive composition may further comprise a carrier gas such as air, nitrogen ($N_2$) or a noble gas such as helium (He), neon (Ne) or argon (Ar). The gaseous, microbially nutritive composition may comprise 4% (v/v) $H_2$; 0.1% (v/v) $N_2O$; and 0.01% (v/v) TEP, TBP.

In another aspect of the invention there is provided a method of stimulating in situ microbial degradation of organic pollutants in a subsurface environment comprising the step of contacting the subsurface environment with a gaseous, microbially nutritive composition comprising hydrogen ($H_2$), nitrous oxide ($N_2O$), one or both of triethylphosphate (TEP) and tributylphosphate (TBP), a carrier gas, and, optionally, a volatile alkane; wherein the composition is introduced to said subsurface environment at a rate, pressure, and time sufficient to degrade said one or more pollutants. The volatile phosphate nutrients may be triethylphosphate (TEP) and tributylphosphate (TBP) in a concentration of 0.001%-1% (v/v); 0.005%-0.5% (v/v); 0.008%-0.02% (v/v); or 0.01% (v/v). The gaseous, microbially nutritive composition may further comprise 0.01%-10% (v/v); 0.015%-5% (v/v); or 0.1% (v/v) nitrous oxide ($N_2O$). The gaseous, microbially nutritive composition may further comprise 1%-50%, 1%-10% (v/v) $H_2$, 2%-7% (v/v) $H_2$, 3%-5% (v/v) $H_2$, or 4% (v/v) $H_2$. The composition may further comprise 0.01%-10% (v/v); 0.015%-5% (v/v); or 0.1% (v/v) nitrous oxide ($N_2O$). The gaseous, microbially nutritive composition may still further comprise 0.1%-20% (v/v); 2%-6% (v/v); 4% (v/v) carbon dioxide ($CO_2$). The gaseous, microbially nutritive composition may further comprise a volatile alkane such as methane, ethane, propane, butane or pentane. Additionally, the composition may further comprise a carrier gas such as air, nitrogen ($N_2$) or a noble gas such as helium (He), neon (Ne) or argon (Ar). Finally, the gaseous, microbially nutritive composition may comprise 4% (v/v) $H_2$; 0.1% (v/v) $N_2O$; and 0.01% (v/v) TEP, TBP.

The methods of the instant invention are used for biodegradation of pollutants that are optionally substituted unsaturated hydrocarbons, optionally substituted partially saturated hydrocarbons, optionally substituted saturated hydrocarbons, halocarbons, or mixtures thereof. The pollutants may be chlorinated hydrocarbons, monocyclic aromatic hydrocarbons, or polycyclic aromatic hydrocarbons. The pollutants may also be benzene, ethylbenzene, nitrobenzene, chlorobenzene, dinitrobenzenes, toluene, xylenes, biphenyl, halobiphenyls, polyhalogenatedbiphenyls, mesitylene, phenol, cresols, aniline, naphthalene, halonaphthalenes, anthracene, phenanthrene, fluorene, benzopyrenes, styrene, dimethylphenol, halotoluenes, benzoanthenes, dibenzofuran, chrysene, catechol, toluic acids, ethylene dibromide, chloroform, tetrachloroethylene, trichloroethylene, dichloroethylene, vinyl chloride, methyl-tert-butyl ether, hexadecane, methanol, and mixtures thereof.

One advantage of the present invention over conventional remediation techniques is that it does not require the removal of soil or groundwater for treatment and subsequent disposal. Instead, the biodegradation of pollutants occurs entirely in situ within a subsurface region. Thus, the present invention presents very little risk of pollutants being released into the atmosphere.

Another advantage afforded by the present invention is that it is straightforward to implement. The equipment is simple and the materials employed are readily obtained. Additionally, remediation occurs during much shorter time frames than with traditional remediation technologies.

Other features and advantages of the present invention will become apparent to those skilled in the art from a careful reading of the Detailed Description of the Preferred Embodiments presented below.

DETAILED DESCRIPTION OF THE PREFERRED EMBODIMENTS

As described in detail herein, the present invention provides a highly efficient, unique method for biodegrading a wide variety of pollutants.

In one embodiment, the volatile phosphate nutrient entrained in a carrier gas is a mixture of triethylphosphate (TEP) and tributylphosphate (TBP). Alternatively, TEP or TBP may be used as the sole phosphate source. Both TEP and TBP exhibit high vapor pressures, and thus mix easily with a carrier gas so that a high concentration of the nutrient may be delivered throughout a bioremediation site. Additionally, TEP and TBP are relatively benign and are the safest phosphate compounds which can be vaporized.

In another embodiment, the composition comprises a carrier gas. The carrier gas can be selected to facilitate either aerobic or anaerobic environments. Where an aerobic environment is desired, the carrier gas comprises air. Where an anaerobic environment is desired, the carrier gas is inert. A preferred inert gas is nitrogen ($N_2$). Alternatively, the inert carrier gas can contain a noble gas. Preferred examples of noble gases are helium, neon, and argon. Thus, the skilled artisan will determine whether biodegradation is most efficacious in an aerobic or anaerobic environment, and can readily adjust the carrier gas accordingly.

In addition to hydrogen ($H_2$) and a volatile phosphate, the gaseous composition of the present invention optionally contains other components. In one embodiment, the composition contains nitrous oxide ($N_2O$), which serves as an additional nutrient to indigenous microbes at the remediation site. In most circumstances, injection of a gaseous composition containing the volatile phosphate nutrient and hydrogen is sufficient to effectively bioremediate a polluted site. However, in another preferred embodiment of the present invention, the gaseous composition contains a volatile alkane. An alkane is a fully saturated hydrocarbon that can serve as an additional microbial energy source where especially pernicious contaminants such as halocarbons are present. Examples of a volatile alkane include methane, ethane, propane, butane, and pentane. Finally, the gaseous composition may comprise carbon dioxide ($CO_2$), which can lower the pH of a particularly alkaline subsurface region. A preferred gaseous composition contains hydrogen, nitrous oxide, one or both of TEP and TBP, a carrier gas, and an optional volatile alkane.

As mentioned above, the present invention is useful in the biodegradation of numerous pollutants. Preferably, the pollutants are organic compounds, such as those typically associated with petroleum waste products. For example, these include optionally substituted unsaturated hydrocarbons, optionally substituted partially saturated hydrocarbons, optionally substituted saturated hydrocarbons, halocarbons, or mixtures thereof. More specifically, the pollutants are chlorinated hydrocarbons, monocyclic aromatic hydrocarbons, and polycyclic aromatic hydrocarbons. Examples of these classes of pollutants include, but are not limited to benzene, ethylbenzene, nitrobenzene, chlorobenzene, dinitrobenzenes, toluene, xylenes, biphenyl, halobiphenyls, polyhalogenatedbiphenyls, mesitylene, phenol, cresols, aniline, naphthalene, halonaphthalenes, anthracene, phenanthrene, fluorene, benzopyrenes, styrene, dimethylphenol, halotoluenes, benzoanthenes, dibenzofuran, chrysene, catechol, toluic acids, ethylene dibromide, chloroform, tetrachloroethylene, trichloroethylene, dichloroethylene, vinyl chloride, methyl-tert-butyl ether, hexadecane, methanol, and mixtures thereof.

A major advantage of the present invention is that its practical application employs inexpensive and readily available equipment such as standard blowers, nitrous oxide tanks, piping, valves, and pressure gauges. For example, the individual gaseous components of the present invention are readily available from commercial sources and are conveniently stored in and dispensed from routine containers employed in the art, including but not limited to cylinders or dewers, bulk transfer tanks, and cryogenic storage tanks. Additionally, some of the components such as hydrogen can be generated through on-site generation, employing means such as sieves, membranes, electrolysis, or fuel cell production.

While not complex, this equipment is utilized at remediation sites where the subsurface environment is typically characterized by heterogeneous physical, chemical, and biological compositions. To ensure that pollutants at a remediation site are effectively eliminated in such an environment, the present invention provides a high degree of control over operating parameters such as the depth, volume, and pressure with which the gaseous composition is injected. Thus, variations in soil properties and stratigraphy may be compensated for by judicious control of these parameters. Additionally, naturally occurring organisms present in subsurface regions may compete for hydrogen. Consequently, those skilled in the art can judiciously correct the concentration of injected hydrogen, taking into account this additional consumption of hydrogen on a site-by-site basis. Other soil properties that may affect the transmission of pollutants and vapors through the subsurface environment can be determined by soil bore surveying techniques that are known to those who are skilled in the art. For example, such techniques are described by Johnson, et al., in "A Practical Approach to the Design, Operation, and Monitoring of In Situ Soil-Venting Systems" in Ground Water Monitoring Review 10, no. 1, 1990, pp. 159-178, and by G. D. Sayles in "Test Plan and Technical Protocol for a Field Treatability Test for Bioventing" from the Environmental Services Office, US Air Force Centers for Environmental Excellence (AFCEE), May 1992.

The gaseous composition may be introduced to a subsurface environment through one or more injection points, the number of which needed may be readily determined by a person skilled in the art. Because the present invention utilizes a gaseous nutritive composition, in contrast to prior art methods using liquid compositions, the injection points may be situated such that the gaseous composition is either sparged into groundwater in the saturated zone, biovented into the vadose zone, or both. Flow rates of the gaseous composition can range from 0.5 to 7 cubic feet per minute (CFM) per injection point. The pressure at which the gaseous composition is injected varies widely, and must be determined on a site-by-site basis. Generally, the injection pressure depends upon factors including the depth at which the gaseous composition is injected and whether it is injected above, in, or below ground water.

The nutrients conveyed to a subsurface environment by the method of the present invention, together with nutrients that are already present at a remediation site, optimize the growth of pollutant-degrading microbes and the rate at which pollutants are degraded. Microbes utilize carbon, nitrogen, and phosphorus in approximately the same ratios as their own bulk C:N:P ratio. Optimum stimulation of a microbial population can be achieved when the gaseous composition of the present invention is tailored to match this C:N:P ratio, which may differ depending not only on the kind of microbe, but on environmental conditions such as the types of pollutants, availability of water, soil pH, and oxidation-reduction potentials. Thus, the optimum C:N:P ratio of the gaseous composition is specific to the conditions of a given remediation site.

The amount of volatile phosphate contained in the gaseous composition varies. In a typical application of the present invention, the concentration of volatile phosphate ranges from 0.001%-1%, preferably 0.005%-0.5%, and most preferably 0.008-0.02% (v/v). An exemplary amount of volatile phosphate is 0.01% (v/v).

The concentration of hydrogen can also vary and must be adjusted according to the particular needs at a remediation site. Hydrogen is consumed in the microbe-mediated reductive dehalogenation of halogenated pollutants, particularly those with high halogen content. It is theoretically possible to use high concentrations of hydrogen, such as those used in the prior art. However, practical considerations such as electrical conduits and other potential sources of ignition present in urban areas where subsurface contamination normally arises will limit the concentration of hydrogen to safe levels. Typically, the concentration of hydrogen in the gaseous composition will vary from 1%-50%, 1% 10%, preferably 2%-7%, and most preferably 3-5% (v/v). An exemplary amount of hydrogen is 4% (v/v).

In some subsurface regions, the amount of naturally occurring nitrogen needed to support microbial growth may be unsuitably low. Therefore, the gaseous composition of this invention may need to be supplemented with nitrous oxide ($N_2O$). When nitrous oxide is used, it is typically present in the amount of 0.01%-10%, and preferably 0.015%-5%. An exemplary amount of nitrous oxide is 0.1% (v/v).

The gaseous composition can contain other components. As mentioned above, a volatile alkane may be used as an additional microbe nutrient. Typically, the alkane is present in the amount of 1%-10% (v/v). Carbon dioxide may be used to lower the pH of particularly alkaline environments. When it is used, carbon dioxide is present in the gaseous composition in the amount of 0.1%-20%, and preferably 2%-6% (v/v). An exemplary amount of carbon dioxide is 4% (v/v).

The method of the present invention is applicable to sites contaminated with a wide variety of contaminants. The concentration of contaminants that remain at a site after treatment by the gaseous composition of this invention can be reduced to levels below detectable limits.

The following example is provided to further describe the invention by way of a specific embodiment of the invention. The example is thus intended to be a non-limiting illustration of the invention.

Example 1

A contaminant plume containing highly chlorinated compounds such as methylene chloride, and TCE located in Herlong, Calif. was subjected to an injection regimen initially designed to induce an anaerobic, reducing environment that is rich in hydrogen and carbon, and containing sufficient nitrogen and phosphorus to support rapid cell growth of indigenous microbes. The gaseous microbially nutritive composition comprised nitrogen as the carrier gas at a concentration of 50% together with a hydrogen source at a concentration of 45%, a propane at a concentration of 4%, nitrous oxide at a concentration of 0.1% and vapor phase TEP at a concentration of 0.01%. TEP was introduced into the gaseous composition by passing the composition (less TEP) through a cylinder gas manifold with rotameters and mixing tubes and contacting it with TEP in a head space contactor. The gaseous microbially nutritive composition was injected into a subsurface region for 8 hours per week for 8 weeks through a sparge point located 100 feet below ground surface. As discussed above, hydrogen provided for the immediate dechlorination of methylene chloride and TCE. Eventually, the growing biomass naturally supplemented the hydrogen supply.

Prior to the injection of the gaseous microbially nutritive composition the concentration of methylene chloride in the groundwater was 117 ppb as determined by the EPA Method 8260. Following the first two weeks of treatment the methylene chloride concentration was reduced to less than detection limits (<1 ppb).

It will be apparent to those who are skilled in the art that numerous changes and substitutions can be made to the preferred embodiments described above without departing from the spirit and scope of the present invention. Any and all publicly available documents cited herein are specifically incorporated in their entirety into this application.

What is claimed is:

1. A method of stimulating in situ microbial degradation of one or more pollutants in a subsurface environment comprising the step of contacting said subsurface environment with a gaseous, microbially nutritive composition comprising:

hydrogen ($H_2$) and one or more volatile phosphate nutrients;

wherein said composition is introduced to said subsurface environment at a rate, pressure, and time sufficient to degrade said one or more pollutants, wherein said pollutants are organic compounds selected from the group consisting of benzene, toluene, ethylbenzene, xylenes, ethylene dibromide, tetrachloroethylene (PCE), and trichloroethylene (TCE).

2. The method according to claim 1 wherein said volatile phosphate nutrients are selected from the group consisting of triethylphosphate (TEP) and tributylphosphate (TBP).

3. The method according to claim 2 wherein said volatile phosphate nutrient is TEP.

4. The method according to claim 2 wherein said volatile phosphate nutrient is TBP.

5. The method according to claim 1 where said composition further comprises nitrous oxide ($N_2O$).

6. The method according to claim 5 wherein the volatile phosphate nutrients are selected from the group consisting of triethylphosphate (TEP) and tributylphosphate (TBP).

7. The method according to claim 1 wherein said composition contains 1%-10% (v/v) $H_2$.

8. The method according to claim 7 wherein said composition contains 2%-7% (v/v) $H_2$.

9. The method according to claim 8 wherein said composition contains 3%-5% (v/v) $H_2$.

10. The method according to claim 9 wherein said composition contains 4% (v/v) $H_2$.

11. The method according to claim 1 wherein said composition contains 0.001%-1% (v/v) volatile phosphate nutrient.

12. The method according to claim 11 wherein said composition contains 0.005%-0.5% (v/v) volatile phosphate nutrient.

13. The method according to claim 12 wherein said composition contains 0.008%-0.02% (v/v) volatile phosphate nutrient.

14. The method according to claim 13 wherein said composition contains 0.01% (v/v) volatile phosphate nutrient.

15. The method according to claim 5 wherein said composition contains 0.01%-10% (v/v) $N_2O$.

16. The method according to claim 15 wherein said composition contains 0.015%-5% (v/v) $N_2O$.

17. The method according to claim 16 wherein said composition contains 0.1% (v/v) $N_2O$.

18. The method according to claim 1 wherein said composition further comprises carbon dioxide ($CO_2$).

19. The method according to claim 18 wherein said composition contains 0.1%-20% (v/v) carbon dioxide.

20. The method according to claim 19 wherein said composition contains 2%-6% (v/v) carbon dioxide.

21. The method according to claim 18 wherein said composition contains 4% (v/v) carbon dioxide.

22. The method according to claim 1 wherein said composition contains 4% (v/v) $H_2$; 0.1% (v/v) $N_2O$; and 0.01% (v/v) TEP, TBP or mixtures thereof.

23. The method according to claim 1 wherein said composition further comprises a volatile alkane.

24. The method according to claim 23 wherein said volatile alkane is methane, ethane, propane, butane, or pentane.

25. The method according to claim 1 wherein said composition further comprises a carrier gas.

26. The method according to claim 25 wherein said carrier gas is air.

27. The method according to claim 25 wherein said carrier gas is inert.

28. The method according to claim 27 wherein said carrier gas is nitrogen ($N_2$).

29. The method according to claim 28 wherein said carrier gas is a noble gas.

30. The method according to claim 29 wherein said noble gas is one selected from the group consisting of helium (He), neon (Ne), and argon (Ar).

31. A method of stimulating in situ microbial degradation of organic pollutants in a subsurface environment comprising the step of contacting said subsurface environment with a gaseous, microbially nutritive composition comprising:
hydrogen ($H_2$), nitrous oxide ($N_2O$),
one or both of triethylphosphate (TEP) and tributylphosphate (TBP),
a carrier gas,
and, optionally, a volatile alkane;
wherein said composition is introduced to said subsurface environment at a rate, pressure, and time sufficient to degrade said one or more pollutants, wherein said pollutants are organic compounds selected from the group consisting of benzene, toluene, ethylbenzene, xylenes, ethylene dibromide, tetrachloroethylene (PCE), and trichloroethylene (TCE).

32. A gaseous, microbially nutritive composition for in situ microbial degradation of one or more pollutants selected from the group consisting of benzene, toluene, ethylbenzene, xylenes, ethylene dibromide, tetrachloroethylene (PCE), and trichloroethylene (TCE) in a subsurface environment, comprising hydrogen ($H_2$) and one or more volatile phosphate nutrients.

33. The composition according to claim 32 wherein said volatile phosphate nutrients are selected from the group consisting of triethylphosphate (TEP) and tributylphosphate (TBP).

34. The composition according to claim 33 wherein said volatile phosphate nutrient is TEP.

35. The composition according to claim 33 wherein said volatile phosphate nutrient is TBP.

36. The composition according to claim 32 where said composition further comprises nitrous oxide ($N_2O$).

37. The composition according to claim 36 wherein the volatile phosphate nutrients are selected from the group consisting of triethylphosphate (TEP) and tributylphosphate (TBP).

38. The composition according to claim 32 wherein said composition contains 1%-10% (v/v) $H_2$.

39. The composition according to claim 38 wherein said composition contains 2%-7% (v/v) $H_2$.

40. The composition according to claim 39 wherein said composition contains 3%-5% (v/v) $H_2$.

41. The composition according to claim 40 wherein said composition contains 4% (v/v) $H_2$.

42. The composition according to claim 32 wherein said composition contains 0.001%-1% (v/v) volatile phosphate nutrient.

43. The composition according to claim 42 wherein said composition contains 0.005%-0.5% (v/v) volatile phosphate nutrient.

44. The composition according to claim 43 wherein said composition contains 0.008%-0.02% (v/v) volatile phosphate nutrient.

45. The composition according to claim 44 wherein said composition contains 0.01% (v/v) volatile phosphate nutrient.

46. The composition according to claim 36 wherein said composition contains 0.01%-10% (v/v) $N_2O$.

47. The composition according to claim 46 wherein said composition contains 0.015%-5% (v/v) $N_2O$.

48. The composition according to claim 47 wherein said composition contains 0.1% (v/v) $N_2O$.

49. The composition according to claim 32 wherein said composition further comprises carbon dioxide ($CO_2$).

50. The composition according to claim 49 wherein said composition contains 0.1%-20% (v/v) carbon dioxide.

51. The composition according to claim 50 wherein said composition contains 2%-6% (v/v) carbon dioxide.

52. The composition according to claim 51 wherein said composition contains 4% (v/v) carbon dioxide.

53. The composition according to claim 32 wherein said composition contains 4% (v/v) $H_2$; 0.1% (v/v) $N_2O$; and 0.01% (v/v) TEP, TBP or mixtures thereof.

54. The composition according to claim 32 wherein said composition further comprises a volatile alkane.

55. The composition according to claim 54 wherein said volatile alkane is methane, ethane, propane, butane, or pentane.

56. The composition according to claim 32 wherein said composition further comprises a carrier gas.

57. The composition according to claim 56 wherein said carrier gas is air.

58. The composition according to claim 56 wherein said carrier gas is inert.

59. The composition according to claim 58 wherein said carrier gas is nitrogen ($N_2$).

60. The composition according to claim 58 wherein said carrier gas is a noble gas.

61. The composition according to claim 60 wherein said noble gas is one selected from the group consisting of helium (He), neon (Ne), and argon (Ar).

\* \* \* \* \*

UNITED STATES PATENT AND TRADEMARK OFFICE
CERTIFICATE OF CORRECTION

PATENT NO. : 7,645,606 B2
APPLICATION NO. : 10/394646
DATED : January 12, 2010
INVENTOR(S) : Priester, III et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 682 days.

Signed and Sealed this

Sixteenth Day of November, 2010

David J. Kappos
*Director of the United States Patent and Trademark Office*